United States Patent
Kim et al.

(10) Patent No.: US 7,447,526 B2
(45) Date of Patent: Nov. 4, 2008

(54) POWER-SAVING METHOD FOR WIRELESS SENSOR NETWORK

(75) Inventors: Jae-Hoon Kim, Seoul (KR); Jung-Ho Kim, Suwon-si (KR); Ji-Hoon Lee, Cheongju-si (KR); Young-Gon Choi, Suwon-si (KR); Young-Sang Kim, Austin, TX (US); Ari Arapostathis, Austin, TX (US)

(73) Assignees: Samsung Electronics Co., Ltd., Suwon-Si (KR); Board of Regents, The University of Texas System, Austin, TX (US)

( * ) Notice: Subject to any disclaimer, the term of this patent is extended or adjusted under 35 U.S.C. 154(b) by 465 days.

(21) Appl. No.: 11/260,686

(22) Filed: Oct. 28, 2005

(65) Prior Publication Data

US 2007/0099678 A1    May 3, 2007

(51) Int. Cl.
*H04B 1/38* (2006.01)

(52) U.S. Cl. ............. 455/574; 455/343.1; 455/343.2; 455/343.4; 370/311; 370/318

(58) Field of Classification Search ............ 455/574, 455/343.1, 424, 425, 456.5, 456.6, 456.2, 455/67.11, 500, 343.2, 343.5, 550.1, 561, 455/575.1, 127.5, 343.4; 340/539.1, 870.01; 375/340, 341, 316, 285; 370/336, 347, 310, 370/476, 338, 311, 318; 379/58, 59, 61, 379/55.1, 56.1, 370–376.02, 433.06, 433.07, 379/368

See application file for complete search history.

(56) References Cited

U.S. PATENT DOCUMENTS

| | | | |
|---|---|---|---|
| 6,870,890 B1* | 3/2005 | Yellin et al. | 375/340 |
| 2003/0210658 A1* | 11/2003 | Hernandez et al. | 370/311 |
| 2004/0023701 A1* | 2/2004 | Hankui | 455/575.7 |
| 2004/0146030 A1* | 7/2004 | Hsieh et al. | 370/336 |
| 2005/0059437 A1* | 3/2005 | Son et al. | 455/574 |
| 2005/0117530 A1* | 6/2005 | Abraham et al. | 370/310 |
| 2005/0210340 A1* | 9/2005 | Townsend et al. | 714/701 |
| 2006/0087423 A1* | 4/2006 | Coronel et al. | 340/539.1 |
| 2006/0100002 A1* | 5/2006 | Luebke et al. | 455/574 |
| 2006/0128349 A1* | 6/2006 | Yoon | 455/343.2 |
| 2007/0124478 A1* | 5/2007 | Abdelhamid et al. | 709/227 |
| 2007/0178875 A1* | 8/2007 | Rao et al. | 455/343.1 |

* cited by examiner

*Primary Examiner*—Edward Urban
*Assistant Examiner*—Charles Chow
(74) *Attorney, Agent, or Firm*—Roylance, Abrams, Berdo & Goodman, LLP

(57) ABSTRACT

A power saving method of the present invention is provide for a wireless sensor network including a plurality of sensor nodes each transiting between a power saving mode and a transmit/receive mode, determines whether or not there is no transmit or receive data, enters the power saving mode if there is no transmit or receive data, and controls power consumption on the basis of signal-to-noise ratios in the power saving mode. In the power saving method of the present invention, it is possible to minimize the power consumption regardless of nodes density and without an adverse effect on the connectivity of the network, since the sojourn times of the sleep and idle states are determined adaptive to the interference level from neighboring nodes.

9 Claims, 4 Drawing Sheets

POWER-SAVING METHOD FOR WIRELESS SENSOR NETWORK

BACKGROUND OF THE INVENTION

1. Field of the Invention

The present invention relates generally to a wireless sensor network and more particularly to a power saving method of sensor nodes of the wireless sensor network.

2. Description of the Related Art

Mainly due to the recent progress in wireless communications, MEMS and microprocessor technology, the practical deployment of wireless sensor networks will soon become a reality. Such a network is envisioned as consisting of a large number sensor nodes, each equipped with a radio transceiver, a small microprocessor and a number of sensing devices, and usually powered by battery. These self-configurable nodes can form a network through which sensor readings can be delivered to the destination. Since the sensor nodes and readings are usually redundant, data can be processed or aggregated as they flow through the network. Because it is infeasible to replenish or recharge the battery of the sensor nodes, their operation is highly constrained by power so that the energy consumption of the nodes is the major operational constraint or concern. To relieve this constraint, many algorithms have been proposed to reduce for the lifetime of network itself to be extended.

Among the extensive list of studies on energy efficiency, a widely used solution to reduce energy consumption is to put nodes to sleep or turn their radio off while they do not contribute to data delivery. This choice stems from the fact that energy consumption in idle mode is comparable to that in receiving mode and that idle time makes up a significant fraction of the node's operational time.

Most notable among the algorithms proposed are the Basic Energy-Conserving Algorithm (BECA), the Adaptive Fidelity Energy-Conserving Algorithm (AFECA), and the Geographical Adaptive Fidelity (GAF). In BECA, the duty cycle (the ratio of sleep time to the idle time) is fixed, while AFECA adaptively decides the sleep period based on the number of neighbor nodes and GAF does this based on the redundant neighbors with the help of the location knowledge from Global Positioning System (GPS).

BECA determines the sojourn times of the nodes such that a node remaining in sleep/idle state can not receive even when there are traffic from other nodes, resulting in deterioration of the network performance.

AFECA adaptively determines the sojourn times depending on the number of adjacent nodes. In order to determine the sojourn times, it is required for the nodes to overhear traffic between the adjacent nodes even when there is no or a little adjacent node(s), resulting in unnecessary power consumption.

In GAF routing protocol, the locations of redundant nodes are discovered with the help of GPS and the sojourn times are determined on the basis of the number of the redundant nodes. However, the GAF is not applicable for sensor networks because of the expensive GPS utilization and much power consumption.

SUMMARY OF THE INVENTION

The present invention has been made in an effort to solve the above and other problems occurring in the prior art, and it is an object of the present invention to provide a power-saving method for wireless sensor networks, which is capable of improving the power efficiency of the sensor.

It is another object of the present invention to provide a power-saving method of a wireless sensor network which is capable of maximizing lifetimes of the nodes by dynamically adjusting sleep and idle times of each node regardless of the nodes density.

It is still another object of the present invention to provide a power-saving method of the sensor network which is capable of dynamically adjusting the sleep and idle times of the sensor nodes without an adverse effect on the connectivity of network.

In accordance with one aspect of the present invention, the above and other objects can be accomplished by a power saving method for a wireless sensor network including a plurality of sensor nodes each managing power consumption. The power saving method includes: detecting transition from a first state to a second state; calculating a sojourn time of the second state on the basis of signal-to-noise ratio; determining whether or not the sojourn time is expired; and transiting to the first state if the sojourn time is expired.

In accordance with another aspect of the present invention there is provided a power saving method for a wireless sensor network including a plurality of sensor nodes each transiting between a power saving mode and a transmit/receive mode. The power saving method includes: determining whether or not there is no transmit or receive data; entering the power saving mode if there is no transmit or receive data; and controlling power consumption on the basis of signal-to-noise ratio.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail hereinafter with reference to the accompanying drawings. In the following description of the present invention, a detailed description of known functions and configurations incorporated herein will be omitted when it may obscure the subject matter of the present invention.

The Signal-to-Interference ratio (SIR) is the ratio of the power of the wanted signal to the total residue power of the unwanted signals. The inverse of SIR, Interference-to-Signal Ration (ISR) is additive, i.e., the overall ISR is the sum of the ISRs due to all unwanted signals, assuming the unwanted signals are independent of the current transmission and each other. Signal strength or path loss from nodes are highly dependent on physical distance and channel status between nodes.

Figure 1:
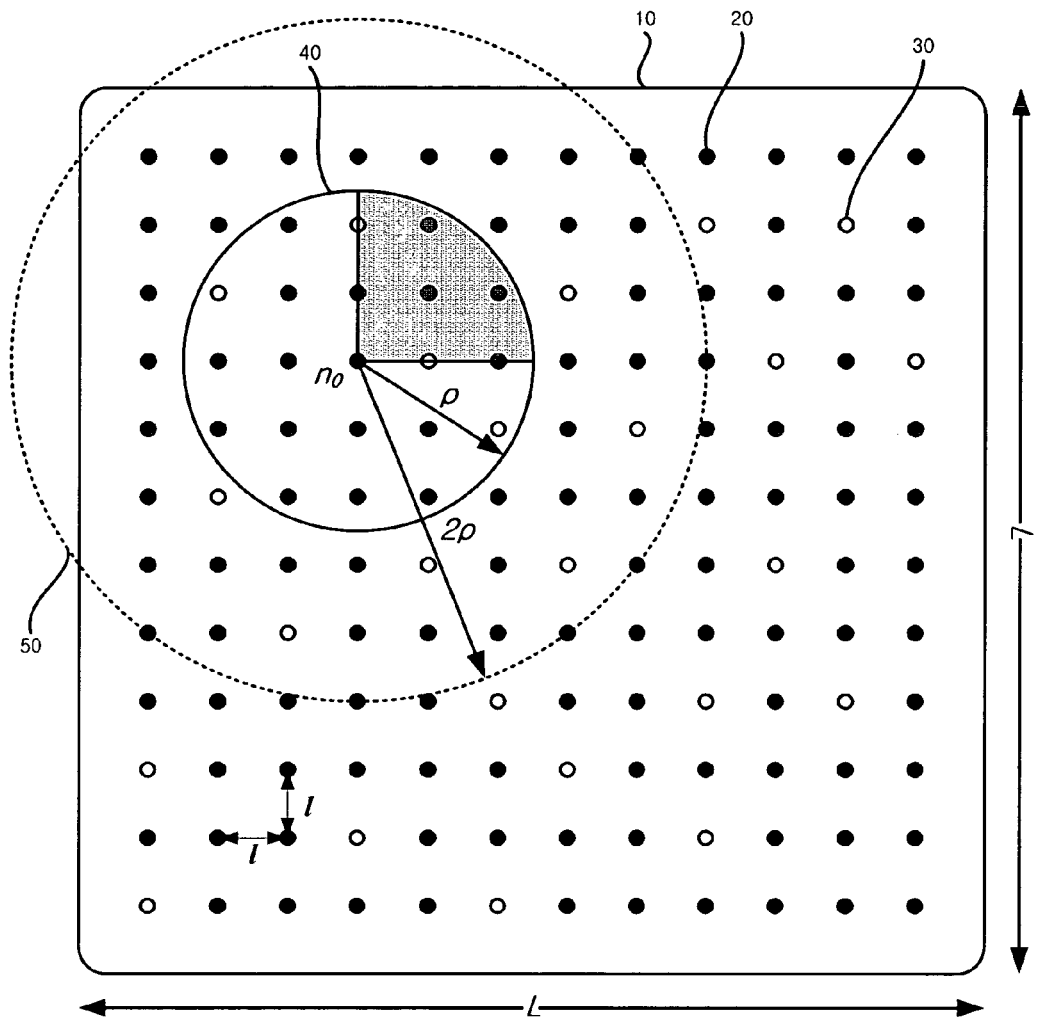
FIG. 1 depicts a schematic view illustrating a wireless sensor network to which a power saving method of the present invention is adopted.

FIG. 1 is a schematic view of a wireless sensor network for illustrating a power saving method of the present invention.

In the present invention, it is assumed that N wireless sensor nodes are uniformly distributed in an L×L square network 10 as depicted in FIG. 1. at a distance l from each other. In FIG. 1, block dots are active sensor nodes 20 and white dots are sleeping sensor nodes 30. The solid line circle indicates the transmission range 40 and the dotted line indicates the sensing range 50.

Each sensor node has a transmission range of ρ and a traffic sensing range of 2ρ. In one embodiment of the present invention, any active node will transmit data to a sink, which works as a gateway, whenever it detects the phenomenon, i.e., gets the broadcasted transmission from a sensor node.

The density of the network is denoted by $$D = \frac{N}{L^2},$$

and $p_k$ denotes the probability of the node k being in sleep mode. Pick an arbitrary node $n_0$. The number of sensor nodes within the transmission range and the sensing range of $n_0$ is $N^T = D\pi\rho^2$ and $N_S = 4D\pi\rho^2$.

Assuming that all nodes transmit packets at the same power $P_{Tx}$, the path loss exponent being K and the Euclidean distance from $n_0$ to $n_i$ being $d_i$, the strength of signals, including interference, sensed by node $n_0$ can be calculated by equation 1.

$$I_0 = P_{Tx} \sum_{i=1}^{N_S^\alpha} \frac{\psi_i}{d_i^K}, \psi_i = \begin{cases} 1, & \text{if node } i \text{ is active} \\ 0, & \text{if node } i \text{ is inactive} \end{cases} \quad (1)$$

Figure 2:
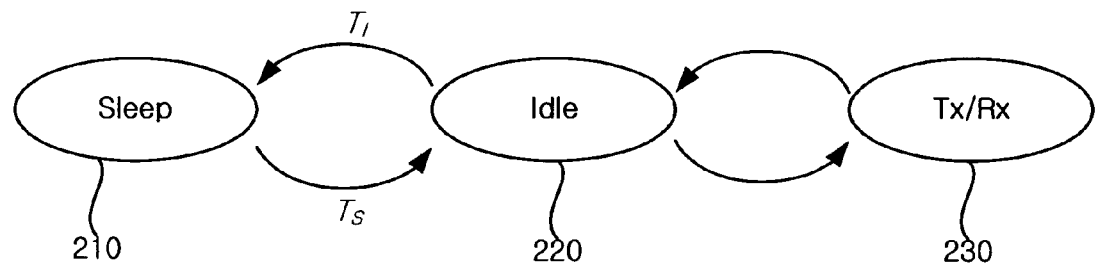
FIG. 2 depicts a state transition diagram of a sensor node according to an embodiment of the present invention.

FIG. 2 is a state transition diagram of a sensor node according to an embodiment of the present invention.

As shown in FIG. 2, there are three operation status for all sensor nodes: Sleep 210, Idle 220, and Tx/Rx 230. The transition between Idle 220 and Tx/Rx 230 occurs automatically. Normally, a sensor node stays in the Idle mode waiting for incoming transmissions, or for the upper layer to initiate sending data, and one or both of these events cause the state to switch to Tx/Rx 230. Then it returns to Idle 220.

In the meantime, the transition between Sleep 210 and Idle 220 is decided by a scheduler. A node stays in Idle mode transits to Sleep mode after $T_I$ seconds, if there is transmission. And it returns to Idle mode after $T_S$.

In the present invention every node monitors signals passing through the physical layer and aggregates the interference. The interference includes the traffics in the sensing range 50 and the capture range 40.

A signal is characterized as interference if its receiving power is below a predetermined threshold or the signal consists of data packets not destined to the node. Calculating the SIR is based upon the incoming signal strength. The signal strength is calculated by the two way ground propagation model in NS-2 and is added to the cumulative SIR.

In the power saving method according to one embodiment of the present invention, the idle time $T_I$ and the sleep time $T_S$ of each node are set based on the rate of change of the cumulative SIR. The average SIR is defined as equation 2.

$$S_e := \frac{\text{Cumulative } SIR \text{ of a node}}{T_O} \quad (2)$$

where $T_O$ is the total operating time of node, while the marginal SIR is as equation 3.

$$\Delta S_e := \frac{\text{Increment in } SIR \text{ of } N \text{ samples}}{T_N} \quad (3)$$

where, $T_N$ denotes the time duration of N samples.

Each node determines the period in which the node will stay as soon as it transits to a new state. That is, the idle time $T_I$ and the sleep time $T_S$ of each node are determined as formulas 4 and 5.

$$T_I \sim u\left(1, \alpha_I \frac{|S_e - \Delta S_e|}{T_O \Delta S_e}\right) \quad (4)$$

$$T_S \sim u\left(1, \alpha_S \frac{|S_e - \Delta S_e|}{T_O \Delta S_e}\right) \quad (5)$$

where, $\alpha_I, \alpha_S \in R_+$ are gains to adjust time.

In formulas (4) and (5), $S_e - \Delta S_e$ determine the amount of time and the division with $\Delta S_e$ will scale up the time to the order of $10^{-1}$, since the SIR is less than the threshold, which is the order of $10^{-12}$. $T_O$ in the denominator will make the time smaller as time goes on so that the algorithm will more adaptive when the energy of nodes becomes scarce, i.e., the node will determine the time more frequently. By taking absolute value of $S_e - \Delta S_e$, a node can determine how long it can stay in idle 220 or sleep 210, even if there're not many interference. This is a case when a node surrounded by several nodes which are not in a route of data traffic. In this case, there will not be many overheard transmissions around it, so is the interference. With small amount of interference, a node won't get into a sleep mode and will waste energy while idling. The value α plays important roles in the present invention. In one embodiment of the present invention 50 of $\alpha_I$ are to determine idle time and 150 of $\alpha_S$ for sleep time. Much large value for idle time is used because $S_e - \Delta S_e$ is usually small in deciding the idle case and the network connectivity and throughput will be hurt with long sleep time. And also the final values of times to be in idle and sleep are randomized using uniform distribution with maximum value as the parameter. Over all algorithm can be termed as "a PID velocity controller with P gain," since the expected SIR can be seen as velocity, which is controlled by a PID controller. A PID controller is widely used in industry due to its robustness and easiness to implement, but is also well known to the difficulty to tune the gains. It is need to intensively analyze how the values of both gains are determined.

When a node wake up from the sleep mode, it will determine the amount of idle time $T_I$ as formula 4. Also, when the node goes into sleep mode, it will determine the amount of sleep time $T_S$ in the same manner. In this case, the randomization will give different time to idle 220 and sleep 210 even though the maximum values, $$\alpha \frac{|S_e - \Delta S_e|}{T_o \Delta S_e},$$

are the same.

Figure 3:
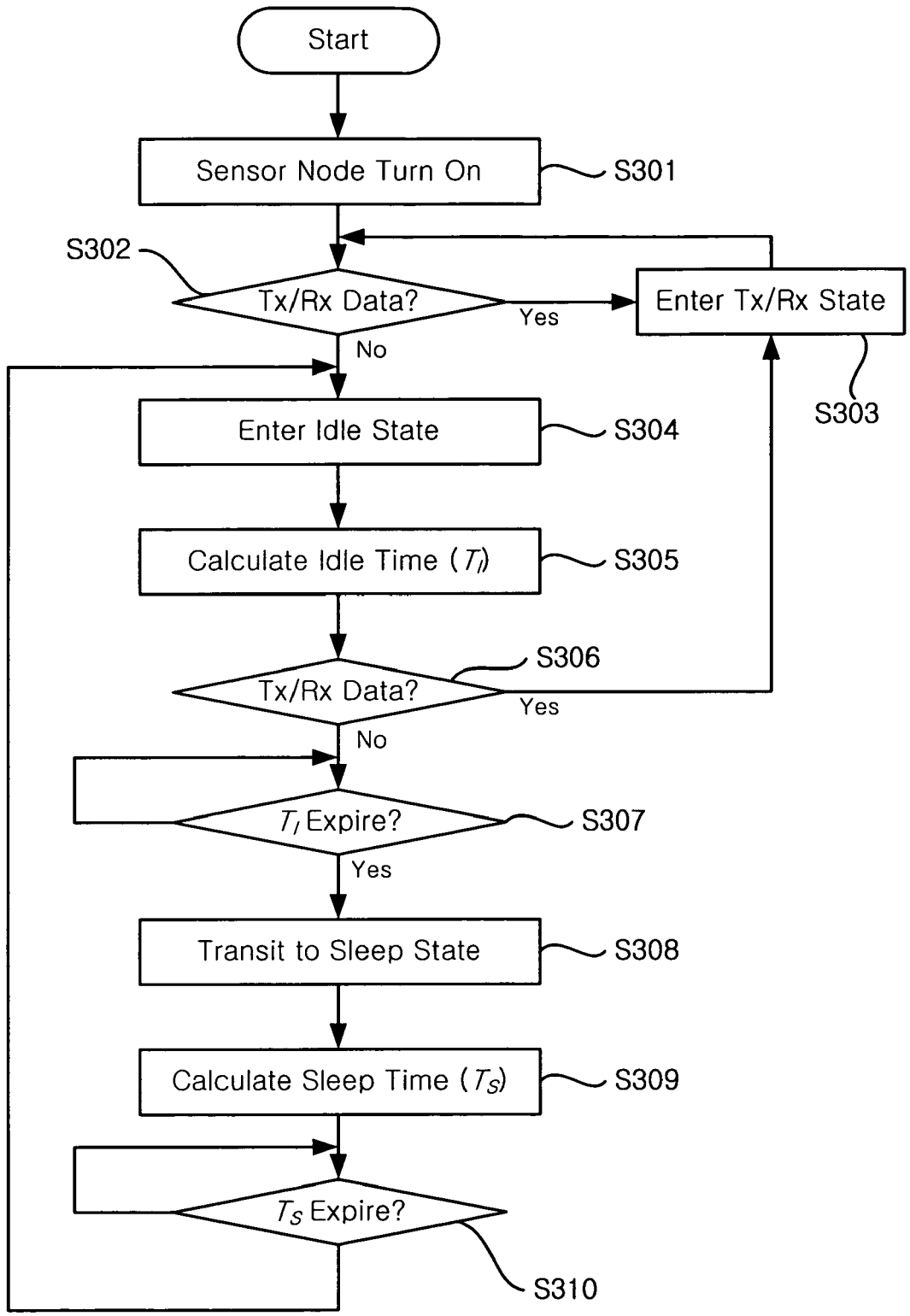
FIG. 3 depicts a flowchart for illustrating the power saving method according to one embodiment of the present invention.

FIG. 3 is a flowchart for illustrating the power saving method according to one embodiment of the present invention.

As shown in FIG. 3, once a sensor node turns on at step S301, it determines whether or not there are data to transmit or receive at step S302. If there are data to transmit or receive, the sensor node enters a Tx/Rx State and continuously monitors the traffic at step S303. On the other hand, there is no data to transmit and receive, the sensor node enters the Idle State at step S304. Upon entering the Idle State, the sensor node calculates the Idle Time ($T_I$) at step S305 and monitors to determine whether or not there are data to transmit or/and receive at step S306. If there are data to transmit or/and receive, the sensor node enters the Tx/Rx State at step S303. If there is no data to transmit or/and receive, the sensor node determines whether or not the Idle Time ($T_I$) is expired at step S307. If the Idle Time is expired, the sensor node enters the Sleep Mode at step S308 and calculates the Sleep Time upon entering the Sleep Mode at step S309. Sequentially, the sensor node counts to determine whether or not the Sleep Time ($T_S$) is expired at step S310 and enters to the Idle State if the Sleep Time ($T_S$) is expired.

As described above, the sensor node calculates the Idle Time and Sleep Time upon transiting to the Idle State and Sleep State based on the formulas (4) and (5), respectively.

The simulation results of the power saving method of the present invention will be described hereinafter. As indicated above, the network is simulated with NS-2 of the version 2.27 and *NRL's Sensor Network Extension to NS*-2. NS-2 is an object-oriented and discrete event simulator developed as part of the VINT project at the University of California in Berkeley. The only fundamental aspect of sensor networks missing in NS-2 was the notion of a phenomenon such as chemical clouds or moving vehicles that could trigger nearby sensors through a channel such as air quality or ground vibrations. Once a sensor detects the "ping" of a phenomenon in that channel, the sensor acts according to the sensor application defined by the NS-2 user. This application defines how a sensor will react once it detects its target phenomenon. For example, a sensor may periodically send a report to some data collection point as long as it continues to detect the phenomenon, or it may do something more sophisticated, such as collaborate with neighboring sensor nodes to more accurately characterize the phenomenon before alerting any outside observer of a supposed occurrence. For each sensor network there is a unique sensor application to accomplish phenomena detection, such as surveillance, environmental monitoring, etc. The NS-2 have provided the facility to invoke sensor applications by phenomena. With these sensor applications, it is possible to study how the underlying network infrastructure performs under various constraints. Before proceeding to describe the simulation, it would be better to mention how this extension works. Basically, a phenomenon is a mobile node same as other mobile nodes in the simulator. The only difference is it periodically injects phenomena into the network through MAC layer. The nodes who want to detect them should establish another channel and attach SENSOR-AGENT to get the traffics. The injected traffics are broadcasted and their transmission range can be controlled by their transmission power.

In this simulation, there are 26 static wireless sensor nodes and one $CO_2$ phenomenon, which will wonder in the network and disseminate the phenomenon every 0.09 seconds. The nodes are uniformly distributed as depicted in FIG. 1 and separated 100 m apart from the nearest node. The ID's increase along upwards first and then along right. Node 26 is in charge of collecting the packets. And important parameters used for this simulation are listed in Table I. The "Radio parameters" are from the specification of the 914 MHz Lucent WaveLAN DSSS radio interface and the "Energy parameters" from "Elective Participation in Ad Hoc Networks Based on Energy Consumption," in Proc. IEEE GLOBECOM 2002, vol. 1, 2002. All the simulations carried out for 100 sec.

TABLE I

SIMULATION PARAMETERS

| Parameters | | Values |
|---|---|---|
| Network | Ad hoc Routing | AODV |
| | Network size | 451 × 451 m$^2$ |
| | # of sensor nodes | 26 (static) |
| | MAC | IEEE 802.11 |
| | Transportation | UDP |
| Radio | Antenna | Omnidirectional |
| | Propagation | Two ray ground |
| | Capture Threshold | 1.559 × 10$^{-11}$ W |
| | Receiving Threshold | 3.652 × 10$^{-10}$ W |
| | Bandwidth | 2 Mbps |
| | TX Power | 0.282 W |
| | Maximum TX Range | 250 m |
| | Carrier Frequency | 914 MHz |
| Energy | Initial Energy | 200.0 J |
| | TX Power | 1.425 W |
| | RX Power | 0.925 W |
| | Idle Power | 0.925 W |
| | Sleep Power | 0.001 W |
| | Sensing Power | 0.001 W |

Figure 4:
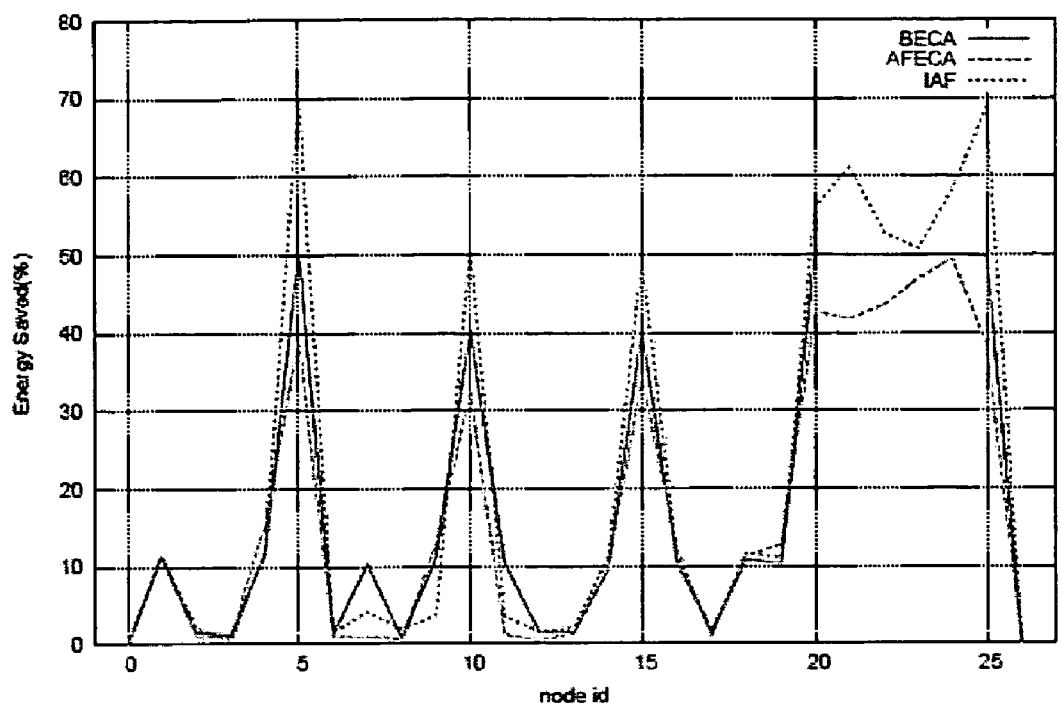
FIG. 4 depicts a graph showing the comparison between the saved energy curve of nodes of conventional power saving methods and the saved energy curve of a node of the power saving method of the present invention.

FIG. 4 is a graph showing the comparison between the saved energy curve of nodes of conventional power saving methods and the saved energy curve of a node of the power saving method of the present invention.

In FIG. 4, the amount of energy saved for each node is shown. The saved energy curve patterns are very similar to each other. This may indicate that interference can tell which node should be in sleep. Though, the saved energy for every nodes operating in the power saving method of the present invention is greater than the nodes operating in conventional power saving methods regardless of the modes. The statistics for the average saved energy of all nodes with the later is shown in Table II. It is shown that the power saving method of the present invention (IBAF) outperforms other power saving schemes and the huge difference in many nodes. Something important to mention here is that the amount of saved energy of AFECA is less than that of BECA.

Figure 5:
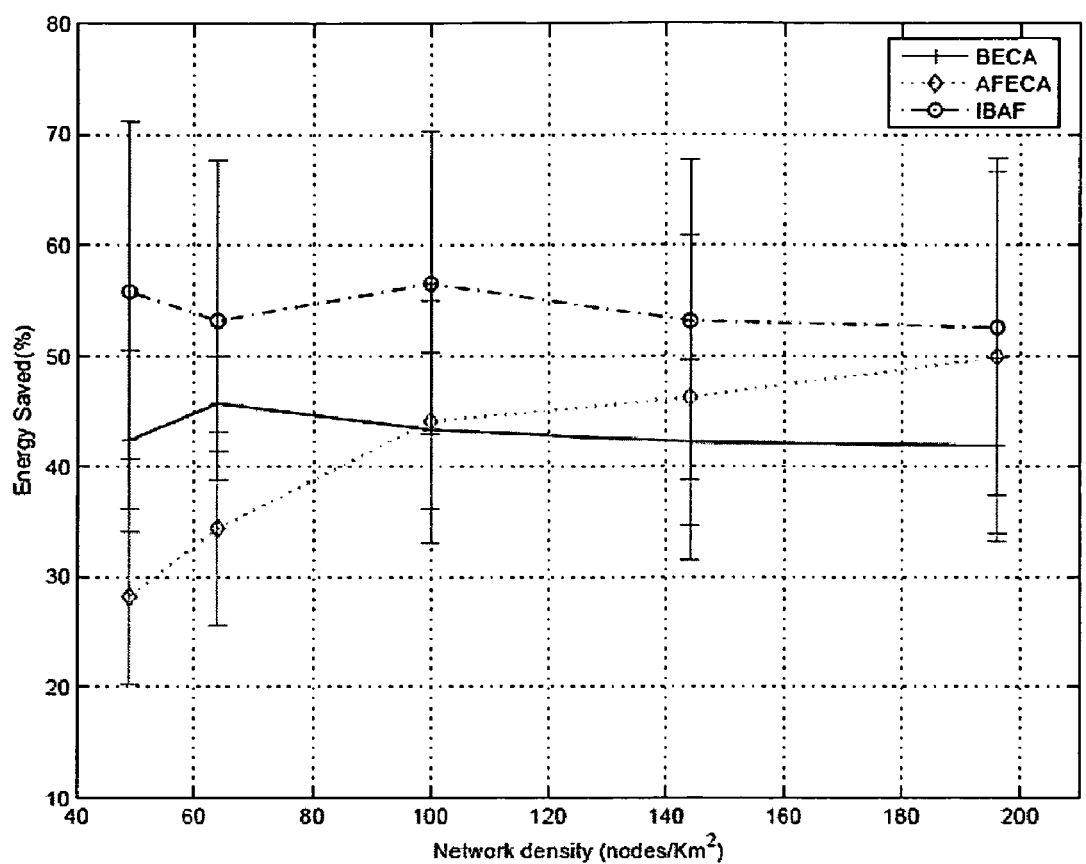
FIG. 5 depicts a graph showing the comparison between the average saved energy curve of the conventional power saving methods and that of the present invention.

FIG. 5 is a graph showing the comparison between the average saved energy curve of the conventional power saving methods and that of the present invention. As shown in FIG. 5. the power saving method (IBAF) of the present invention outperform the BECA and AFECA regardless of the network density.

TABLE II

SAVED ENERGY OF EACH SAVING SCHEMES

| Parameters | MAX (%) | Avg (%) | Std (%) |
| --- | --- | --- | --- |
| BECA | 50.165 | 21.379 | 20.718 |
| AFECA | 49.486 | 18.469 | 18.113 |
| IBAF | 69.643 | 24.323 | 26.058 |

As described above, since the power saving method of the present invention determines the sojourn times of the sleep and idle states adaptive to the interference level from neighboring nodes, it is possible to minimize the power consumption regardless of nodes density and without an adverse effect on the connectivity of the network.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A power saving method for a wireless sensor network including a plurality of sensor nodes each managing power consumption, comprising:
   detecting transition from a first state to a second state;
   calculating a sojourn time of the second state on the basis of a difference between an average signal-to-interference ratio and a marginal signal-to-interference ratio;
   determining whether or not the sojourn time is expired; and
   transiting to the first state if the sojourn time is expired.

2. The method of claim 1, wherein the sojourn time is calculated as following formula:

$$T \sim U\left(1, \alpha \frac{|S_e - \Delta S_e|}{T_O \Delta S_e}\right),$$

where $U(\cdot)$ is a uniform random function, $$S_e := \frac{\text{Cumulative } SIR \text{ of a node}}{T_O},$$

$$\Delta S_e := \frac{\text{Increment in } SIR \text{ of } N \text{ samples}}{T_N},$$

wherein $S_e$ denotes the average signal-to-interference ratio, $\Delta S_e$ denotes the marginal signal-to-interference ratio, $T_O$ is the total operating time of a node, $\alpha \in R_+$ is gain to adjust time, and $T_N$ denotes the time duration of N samples.

3. The method of claim 1, wherein the first state is idle state for listening to the wireless medium and the second state is a sleep state for minimizing the power consumption.

4. The method of claim 3, wherein the sojourn time of the sleep state is calculated as following formula:

$$T_S \sim U\left(1, \alpha_S \frac{|S_e - \Delta S_e|}{T_O \Delta S_e}\right),$$

where $U(\cdot)$ is a uniform random function, $$S_e := \frac{\text{Cumulative } SIR \text{ of a node}}{T_O},$$

$$\Delta S_e := \frac{\text{Increment in } SIR \text{ of } N \text{ samples}}{T_N},$$

wherein $S_e$ denotes the average signal-to-interference ratio, $\Delta S_e$ denotes the marginal signal-to-interference ratio, $T_O$ is the total operating time of a node, $\alpha_S \in R_+$ is gain to adjust time, and $T_N$ denotes the time duration of N samples.

5. The method of claim 1, wherein the first state is a sleep state for minimizing the power consumption and the second state is an idle state for listening to the wireless medium.

6. The method of claim 5, wherein the sojourn time of the idle state is calculated as following formula:

$$T_I \sim U\left(1, \alpha_I \frac{|S_e - \Delta S_e|}{T_O S_e}\right),$$

where $U(\cdot)$ is a uniform random function, $$S_e := \frac{\text{Cumulative } SIR \text{ of a node}}{T_O},$$

$$\Delta S_e := \frac{\text{Increment in } SIR \text{ of } N \text{ samples}}{T_N},$$

wherein $S_e$ denotes the average signal-to-interference ratio, $\Delta S_e$ denotes the marginal signal-to-interference ratio, $T_O$ is the total operating time of a node, $\alpha_I \in R_+$ is gain to adjust time, and $T_N$ denotes the time duration of N samples.

7. A power saving method for a wireless sensor network including a plurality of sensor nodes each transiting between a power saving mode and a transmit/receive mode, comprising:
   determining whether or not there is no transmit or receive data;
   entering the power saving mode if there is no transmit or receive data; and
   controlling power consumption on the basis of signal-to-noise ratio, wherein the power saving mode includes an idle state for listening to the wireless medium and a sleep state for minimizing power consumption,
   and the step of controlling the power consumption includes:
   detecting transition between the idle state and the sleep state;
   determining whether or not the transition is from idle state to the sleep state;
   calculating a first sojourn time of the sleep state on the basis of a difference between an average signal-to-interference ratio and a marginal signal-to-interference ratio upon transiting to the sleep state;
   determining whether or not the first sojourn time is expired; and
   returning to the idle state if the first sojourn time is expired.

8. The method of claim 7, wherein the step of controlling the power consumption further includes:

calculating a second sojourn time of the idle state upon transiting to the idle state;

determining whether or not the second sojourn time is expired; and returning to the sleep state if the second sojourn time is expired.

9. The method of claim 7, wherein the first and second sojourn times are calculated as following formulas:

$$T_I \sim U\left(1, \alpha_I \frac{|S_e - \Delta S_e|}{T_O \Delta S_e}\right),$$

$$T_S \sim U\left(1, \alpha_S \frac{|S_e - \Delta S_e|}{T_O \Delta S_e}\right),$$

where $U(\cdot)$ is a uniform random function, $\alpha_I, \alpha_S \in R_+$ are gains to adjust time, $$S_e := \frac{\text{Cumulative } SIR \text{ of a node}}{T_O},$$

$$\Delta S_e := \frac{\text{Increment in } SIR \text{ of } N \text{ samples}}{T_N},$$

wherein $S_e$ denotes the average signal-to-interference ratio, $\Delta S_e$ denotes the marginal signal-to-interference ratio, $T_O$ is the total operating time of a node, and $T_N$ denotes the time duration of N samples.

* * * * *